(12) United States Patent
Mizutani et al.

(10) Patent No.: US 6,739,537 B2
(45) Date of Patent: *May 25, 2004

(54) SINGLE-REEL TAPE CARTRIDGE WITH LEADER LOCKING MECHANISM

(75) Inventors: Hikaru Mizutani, Ibaraki (JP); Nobutaka Miyazaki, Ibaraki (JP); Teruo Sogabe, Ibaraki (JP)

(73) Assignee: Hitachi Maxell, Ltd., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/804,042

(22) Filed: Mar. 13, 2001

(65) Prior Publication Data

US 2001/0035470 A1 Nov. 1, 2001

(30) Foreign Application Priority Data

Mar. 13, 2000 (JP) ......................................... 2000-069505

(51) Int. Cl.[7] ................................................ G11B 23/04
(52) U.S. Cl. ................ 242/332.4; 242/338.1; 242/348.2; 360/132
(58) Field of Search ........................... 242/332.4, 348.2, 242/580, 338.1, 338.3; 360/132

(56) References Cited

U.S. PATENT DOCUMENTS

| | | | | |
|---|---|---|---|---|
| 4,886,220 A | * | 12/1989 | Oishi | ...................... 242/338.3 |
| 5,883,771 A | | 3/1999 | Hoerger | ...................... 360/132 |
| 5,971,310 A | * | 10/1999 | Saliba et al. | ............. 242/332.4 |
| 6,236,539 B1 | * | 5/2001 | Morita et al. | ................ 360/132 |
| 6,502,776 B2 | * | 1/2003 | Sogabe et al. | ........... 242/332.4 |

FOREIGN PATENT DOCUMENTS

| | | |
|---|---|---|
| JP | A117749 | 1/1999 |
| JP | 11232826 | 8/1999 |

* cited by examiner

*Primary Examiner*—John Q. Nguyen
(74) *Attorney, Agent, or Firm*—Birch, Stewart, Kolasch & Birch, LLP

(57) ABSTRACT

A single-reel tape cartridge cooperable with an operatively compatible tape drive including a tape catch member (H) includes a cartridge housing (1) having a tape window (4) defined therein and accommodating therein a single reel (2) with a roll of a length of magnetic recording tape (3) thereon. A leader pin (14) is secured to a free end of the magnetic tape (3) and engageable with the tape catch member (H) when the length of magnetic tape is to be drawn out of the cartridge housing and into the tape drive. A releasable locking mechanism for locking the leader pin (14) in a predetermined posture at a retracted position at which the leader pin is housed within the cartridge housing (1) and positioned adjacent the tape window (4) includes a pair of first locking members (19) and a second locking member (20) cooperable with each other to lock the leader pin (14) at a retracted position.

15 Claims, 5 Drawing Sheets

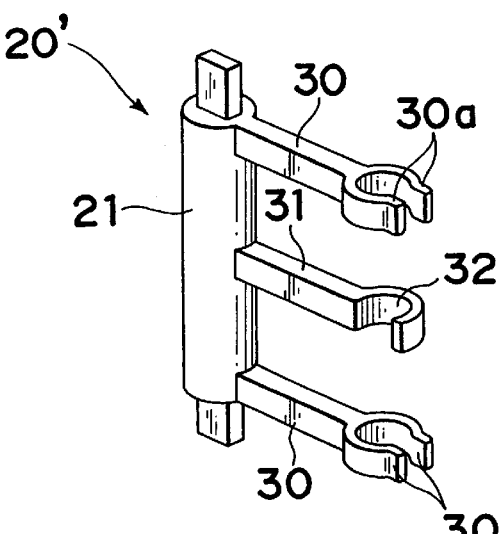
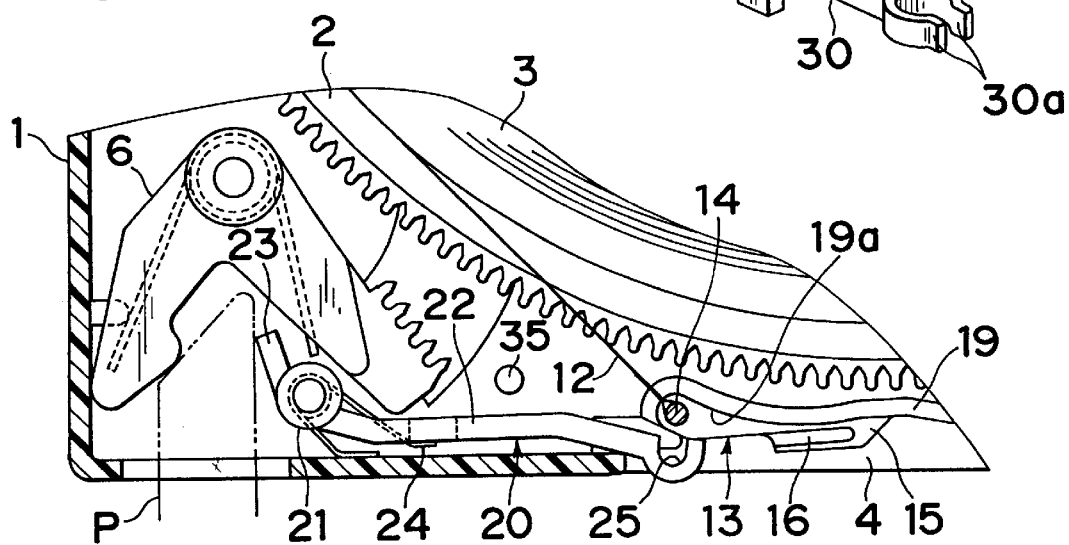
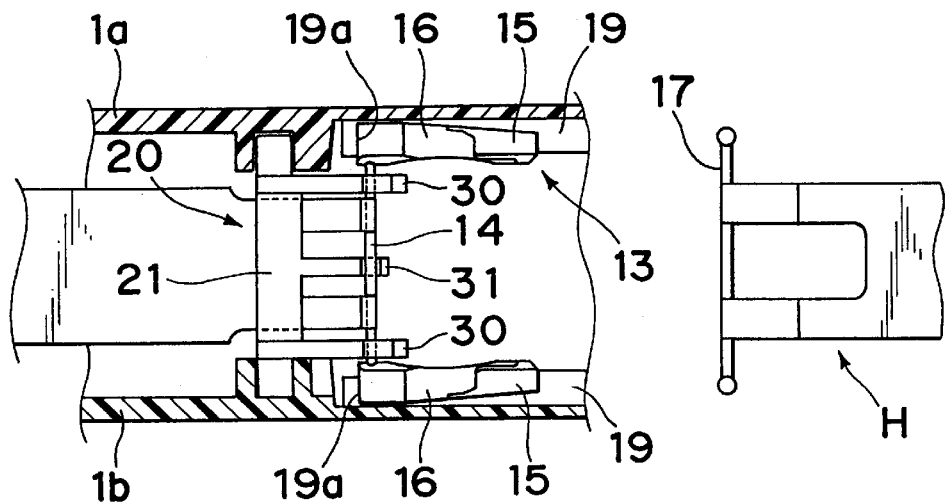

SINGLE-REEL TAPE CARTRIDGE WITH LEADER LOCKING MECHANISM

BACKGROUND OF THE INVENTION

1. Field of the Invention

The present invention generally relates to a single-reel recording tape cartridge and, more particularly, to the single-reel recording tape cartridge of a kind including a leader piece which is, when in use, captured by a catch member, forming a part of an automatic tape threading mechanism built in the tape drive, so that a length of magnetic recording tape can be drawn out of the cartridge.

2. Description of the Prior Art

The tape cartridge of the kind referred to above is well known in the art and is disclosed in, for example, the Japanese Laid-open patent publications No. 11-7749, published Jan. 12, 1999, and No. 11-232826, published Aug. 27, 1999, and U.S. Pat. No. 5,883,771 issued Mar. 16, 1999. In general, the single-reel recording tape cartridge includes a generally rectangular cartridge housing having a reel chamber defined therein, and a single reel freely rotatably accommodated within the reel chamber and having a roll of a length of magnetic recording tape mounted thereon. The length of magnetic recording tape has one end anchored to a reel hub and the opposite end coupled with the leader piece. When the cartridge is in use having been loaded into a tape drive for data recording or retrieval, a catch member forming a part of an automatic reeling mechanism built in the tape drive captures the leader piece to draw the magnetic recording tape out of the cartridge housing in readiness for data recording or retrieval in cooperation with a magnetic read/write head.

The leader piece disclosed in the publication No. 11-7749 is a generally hook-shaped, plastics-molded leader that is, when the cartridge is not in use, retained at a retracted position in a cantilevered fashion by means of a pair of projections disposed inside the cartridge housing at a location inwardly of a tape window in the cartridge housing.

The leader piece disclosed in the publication No. 11-232826 is in the form of a metal pin having its opposite ends formed with an engagement boss. The leader piece disclosed in this publication is, when the cartridge is not in use, retained at a retracted position with its opposite engagement bosses received within generally U-shaped bearing recesses defined in top and bottom panels of the cartridge. Barrier walls for preventing a spring element from being displaced in position are formed adjacent the associated bearing recesses so as to protrude parallel to the top and bottom panels, respectively. The spring element is in the form of a torsion spring having opposite spring arms, one of which is formed with a generally arcuate portion adapted to engage the corresponding engagement boss when the leader piece is not in use.

As discussed above, the single-reel recording tape cartridge in general makes use of the leader piece to ensure a sure withdrawal of the length of magnetic recording tape out of the cartridge housing in cooperation with the catch member. In order for the catch member to capture the leader piece properly when the cartridge is in use, care must however be taken to allow the leader piece to be kept at the retracted position firmly in a proper posture or substantially in a proper posture within a permissible range in the event of an impact or shock imposed on the cartridge. However, as is well known to those skilled in the art, the single-reel tape cartridge for a specific application, for example, for use in a computer-based information processing environment is generally heavier than the two-reel tape cartridge and, therefore, the single-reel tape cartridge has a relatively large kinetic inertia.

Accordingly, in the event that the single-reel tape cartridge is inadvertently fallen down onto, for example, a floor, the single-reel tape cartridge is susceptible to a relatively high impact. For example, one or more reel locking pawls used to hold the tape reel in a stationary position within the cartridge housing when the tape cartridge is not in use may be instantaneously disengaged from the reel or damaged detrimentally, resulting in loosening of the length of magnetic recording tape that has been firmly wound around the reel hub. Loosening of the length of magnetic recording tape may be in turn accompanied by an undesirable displacement of the leader piece from the retracted position or separation of the leader piece out of the cartridge housing.

The retracted position for the leader piece is generally defined within the cartridge housing and at a location adjacent to and inwardly of the tape window defined in a part of the peripheral wall of the cartridge housing. The tape window is selectively opened or closed by a door member so that when the door member is in a closed position, the reel chamber can be protected from potential sources of harm such as dust and particulate contaminants that would give rise to damage to the magnetic tape within the reel chamber.

Accordingly, in the event that the tape cartridge is inadvertently fallen onto the floor with the leader piece consequently displacing from the retracted position and/or departing from the proper posture, no one can ascertain whether or not the leader piece has displaced or departed, unless one looks into the reel chamber externally through the window by opening the door. In most cases, however, unless the tape cartridge housing including the door is physically deformed and/or damaged in its appearance even though the leader piece inside the cartridge housing would have displaced from the retracted position and/or departed from the proper posture, such tape cartridge is provided for actual use in the tape drive. The outcome would be that the catch member, forming a part of the automatic tape threading mechanism built in the tape drive, fails to catch or grab the leader piece. This is indeed detrimental to obtainment of consistently smooth tape winding within the tape drive preparatory to data recording or retrieval.

SUMMARY OF THE INVENTION

Accordingly, the present invention is primarily intended to provide an improved, highly reliable single-reel tape cartridge including the leader piece that is held firmly at the retracted position in a proper posture regardless of whether or not the impact acts on the tape cartridge, to thereby ensure obtainment of consistently smooth tape winding within the tape drive preparatory to data recording or retrieval.

In order to accomplish this and other objects of the present invention, there is in accordance with the present invention provided a single-reel tape cartridge cooperable with an operatively compatible tape drive including a tape catch member, which cartridge includes a cartridge housing having a tape window defined therein, and a single reel rotatably accommodated within the cartridge housing and having a roll of a length of magnetic recording tape coaxially mounted thereon. The length of magnetic recording tape has one end anchored to the reel and the opposite end provided with a leader member that is positioned adjacent the tape window. The leader member is engageable with the tape catch member when the length of magnetic tape is to be drawn out of the cartridge housing and into the tape drive. A releasable locking mechanism is provided, including a pair of first locking members and a second locking member cooperable with each other to lock the leader member at a retracted position at which the leader member is housed within the cartridge housing and positioned adjacent the tape window. The first locking members are secured to top and bottom panels of the cartridge housing adjacent the tape window for receiving the leader member at the retracted position in a predetermined posture whereas the second locking member is positioned adjacent the tape window and cooperate with the first locking members to lock the leader member at the retracted position.

According to the present invention, because of the use of the releasable locking mechanism in the single-reel tape cartridge, even though the leader member undergoes a motion under the influence of impact imposed on the tape cartridge as a result of the tape cartridge being, for example, fallen onto a floor, the leader member can advantageously be retained and locked at the retracted position without substantially displacing in position. Accordingly, when the length of magnetic tape is desired to be drawn out of the tape cartridge, no misalignment of the catch member on the part of the tape drive with the leader member in the tape cartridge will occur substantially. Thus, the present invention is effective to ensure a sure engagement of the catch member with the leader member.

In a preferred embodiment of the present invention, the leader member is in the form of a leader pin having a hooking arm connected to each of opposite ends of the leader pin so as to extend generally perpendicular to the leader pin. The hooking arms on the respective ends of the leader pin can cooperate with the catch member to allow the latter to engage the leader member when the length of magnetic tape is to be drawn out of the cartridge housing.

In such case, the second locking member may include an elongated lock body supported by the cartridge housing, and a biasing spring housed within the cartridge housing for urging the elongated lock body in a direction required for the elongated lock body to engage the leader pin. The second locking member may be either pivotally supported or fixedly supported in the cartridge housing.

More specifically, the second locking member may include a bearing boss journalled by and within the cartridge housing for angular movement about its own longitudinal axis, an elongated lock body formed integrally with the bearing boss so as to extend in a first direction generally perpendicular to the longitudinal axis of the bearing boss, and a lock release piece formed integrally with the bearing boss so as to extend in a second direction counter to the first direction, said elongated lock body applying a retaining force to the leader pin to lock the leader pin at the retracted position in cooperation with the first locking members.

Alternatively, the second locking member may include a bearing boss disposed within the cartridge housing with its own longitudinal axis perpendicular to a lengthwise direction of the magnetic tape, an elongated lock body formed integrally with the bearing boss so as to extend in a first direction generally perpendicular to the bearing boss, said elongated lock body including at least one lock arm having a free end thereof bifurcated to define a pair of elastically deformable embracing pieces for receiving the leader pin 14 therein, and at least one receiving arm having a free end thereof formed with a hook for holding the leader pin, and wherein a direction of detachment of the leader pin relative to the lock arm and a direction of detachment of the leader pin relative to the receiving arm lie at an angle to each other.

Again alternatively, the second locking member may include a bearing boss disposed within the cartridge housing with its own longitudinal axis perpendicular to a lengthwise direction of the magnetic tape, an elongated lock body formed integrally with the bearing boss so as to extend in a first direction generally perpendicular to the bearing boss, said elongated lock body including a pair of receiving arms for engagement with opposite ends of the leader pin in a direction outwardly of the cartridge housing and a lock arm for receiving a portion of the leader pin intermediate between the opposite ends thereof.

The number of one or both of the receiving arms and the lock arms may not be limited to one, but two or more of them can be employed.

Preferably, the cartridge housing may have a pivotally supported door for selectively closing or opening the tape window and having an inner side face leading towards an interior of the cartridge housing, in which case the inner side face of the door is preferably configured to retain the leader pin at the retracted position when the door is in position to close the tape window.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become readily understood from the following description of preferred embodiments thereof made with reference to the accompanying drawings, in which like parts are designated by like reference numeral and in which:

FIG. 7 is a view similar to FIG. 6, showing the locking member of FIG. 6 held at the release position;

FIG. 8 is a perspective view showing the locking member employed according to a third preferred embodiment of the present invention;

FIG. 9 is a view similar to FIG. 3, showing that portion of the tape cartridge according to the third preferred embodiment of the present invention;

DESCRIPTION OF THE EMBODIMENTS

First Embodiment (FIGS. 1 to 5)

Figure 1:
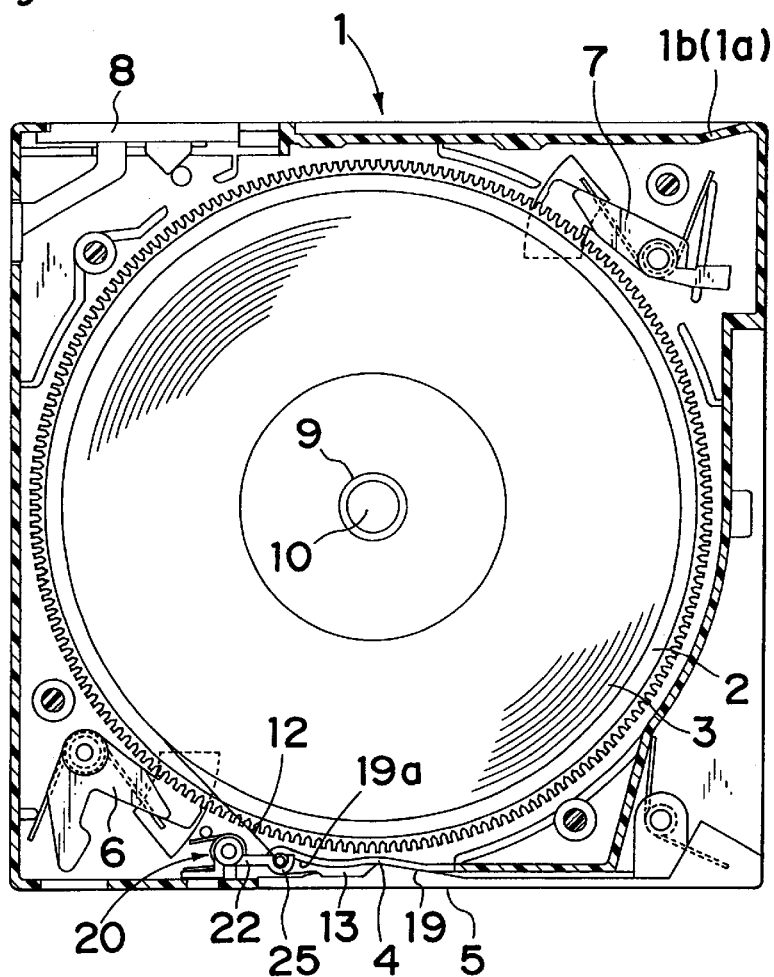
FIG. 1 is a top plan view of a single-reel tape cartridge according to a first preferred embodiment of the present invention, with a top casing half removed to show component parts inside the tape cartridge.

A single-reel tape cartridge according to a first preferred embodiment of the present invention is shown in FIGS. 1 to 5. Referring first to FIG. 1, the tape cartridge includes a cartridge housing 1 of a generally rectangular configuration made up of top and bottom housing halves 1a and 1b. The cartridge housing 1 may be of any known construction and, accordingly, suffice it to say that when the top and bottom housing halves 1a and 1b are assembled together, the cartridge housing 1 has top and bottom panels and a four peripheral walls lying perpendicular to any one of the top and bottom panels and including front, rear and side wall segments, with a reel chamber defined between the top and bottom housing halves 1 and 1b. This cartridge housing 1 also includes an erasure preventive switching piece 8 slidably supported by the rear wall of the cartridge housing 1 for movement between a write enable position and a write disable position in any known manner. The front wall of the cartridge housing 1 opposite to the rear wall thereof is formed with a tape window 4 adapted to be selectively opened or closed by a generally elongated pivotable door 5 that is normally biased towards a closed position by a spring element, for example, a torsional spring to close the tape window 4 and is locked at the closed position by any suitable releasable door lock mechanism (not shown).

A single reel 2 is freely rotatably accommodated within the reel chamber and includes a reel hub and at least one radial flange which may be formed integrally with one end of the reel hub, preferably a lower end of the reel hub adjacent the bottom panel of the reel housing 2, so as to extend radially outwardly therefrom. The radial flange has an outer peripheral edge formed with a series of gear teeth. Reel locking pawls 6 and 7 selectively engageable with the gear teeth of the radial flange to hold the single reel 2 in a stationary position when the reel cartridge is not in use are operatively accommodated within diagonally opposite corner areas of the cartridge housing 1. It is to be noted that the reel locking pawls 6 and 7 are normally biased by respective spring elements, for example, torsional springs, towards the gear teeth of the radial flange.

With the single reel 2 held in position within the reel chamber in the manner described above, a length of magnetic recording tape 3 having one end anchored to the reel hub is spirally wound around the reel hub. Also, a biasing spring, for example, a coiled spring 9 is interposed between the reel hub and the top panel of the cartridge housing 1 to urge the reel 2 downwardly towards the bottom panel of the cartridge housing 1, to thereby minimize an undesirable axial rattling motion of the single reel 2 within the reel chamber. If desired, a freely rotatable steel ball may intervene between the coil spring 9 and the reel hub to facilitate a smooth rotation of the single reel 2 about its own longitudinal axis.

Figure 2:
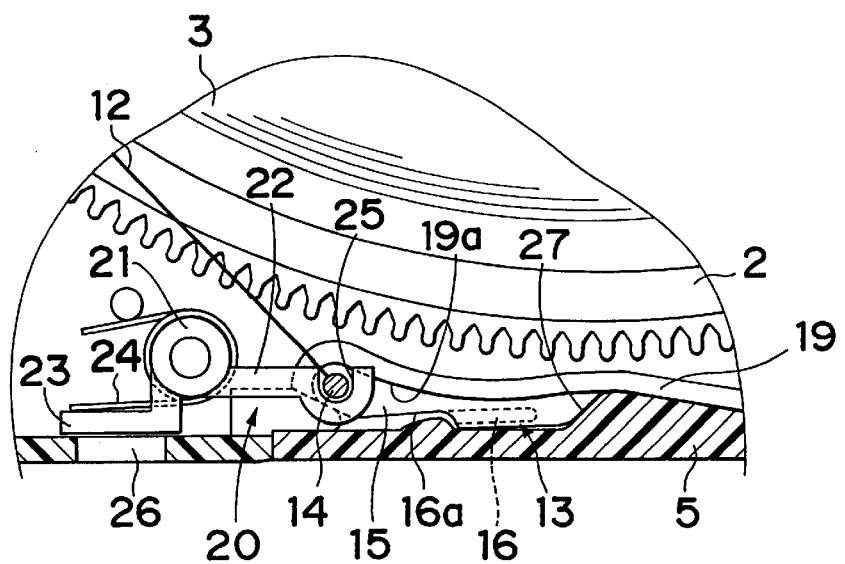
FIG. 2 is a fragmentary top plan view, on an enlarged scale, of a front portion of the single-reel tape cartridge of FIG. 1, showing a lock member held at a locking position to retain the leader member at the retracted position.
Figure 3:
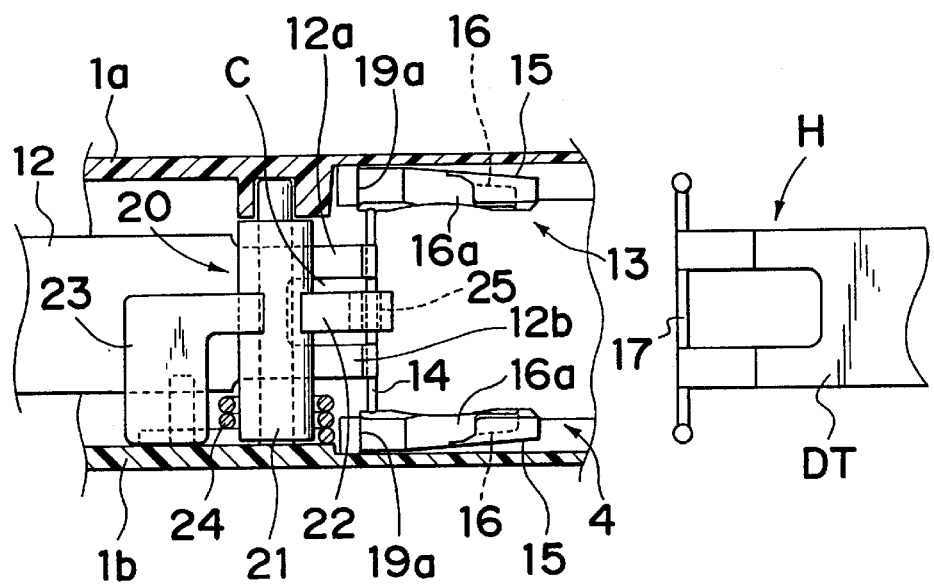
FIG. 3 is a fragmentary transverse sectional view of a portion of the tape cartridge shown in FIG. 1, showing the lock member for locking the leader member at the retracted position as viewed through a tape window defined in the tape cartridge.

In order to enable the free end of the length of magnetic tape 3 to be pulled outwardly from the cartridge housing 1, a leader member 13 is secured to a leader tape 12 which may be either a part of the free end of the magnetic tape 3 or a separate member welded to the free end of the magnetic tape 3. The leader member 13 is operatively cooperable with a catch member H that forms a part of any known automatic tape threading mechanism built in the tape drive (not shown). As best shown in FIGS. 2 and 3, the leader member 13 employed in the illustrated embodiment is of a generally U-shaped configuration including a metallic leader pin 14 preferably made of stainless steel, and a hooking arm 15 fixedly mounted on each of opposite ends of the leader pin 14 so as to protrude in a direction generally perpendicular to the leader pin 14.

As best shown in FIG. 3, a free end of the leader tape 12 remote from the magnetic tape 3 has a cutout C defined intermediate of the width of the leader tape 12 so as to extend a distance inwardly therefrom with respect to the lengthwise direction of the leader tape 2, thereby leaving upper and lower tape end segments 12a and 12b. The upper and lower tape end segments 12a and 12b of the leader tape 2 are turned around the leader pin 14 so as to extend backwards and are welded or bonded to a portion of the leader tape 2 inwardly of the cutout C to thereby connect the leader pin 14 to the leader tape 12. Thus, the leader pin 14 so connected with the leader tape 12 is freely rotatable relative to the leader tape 12 within respective loops that are defined respectively by the upper and lower tape end segments 12a and 12b of the leader tape 2 when the upper and lower tape end segments are turned therearound.

The hooking arms 15 are made of plastic, and the leader pin 14 is insert-molded together with the hooking arms 15 during molding of the hooking arms 15. The upper and lower hooking arms 15 are of a substantially identical construction and are symmetrically positioned on the respective ends of the leader pin 14 with respect a point intermediate of the length of the leader pin 14. Each of the hooking arms 15 having a longitudinal axis lying generally perpendicular to the leader pin 14 is substantially curved to follow the curvature of the roll of the magnetic tape 3 on the single reel 2. Each hooking arms 15 has inner and outer side faces opposite to each other, the inner side face facing the roll of magnetic tape 3 when and so long as the leader member 13 is held in a retracted position within the cartridge housing 1 as shown in FIGS. 1 and 2.

Figure 4:
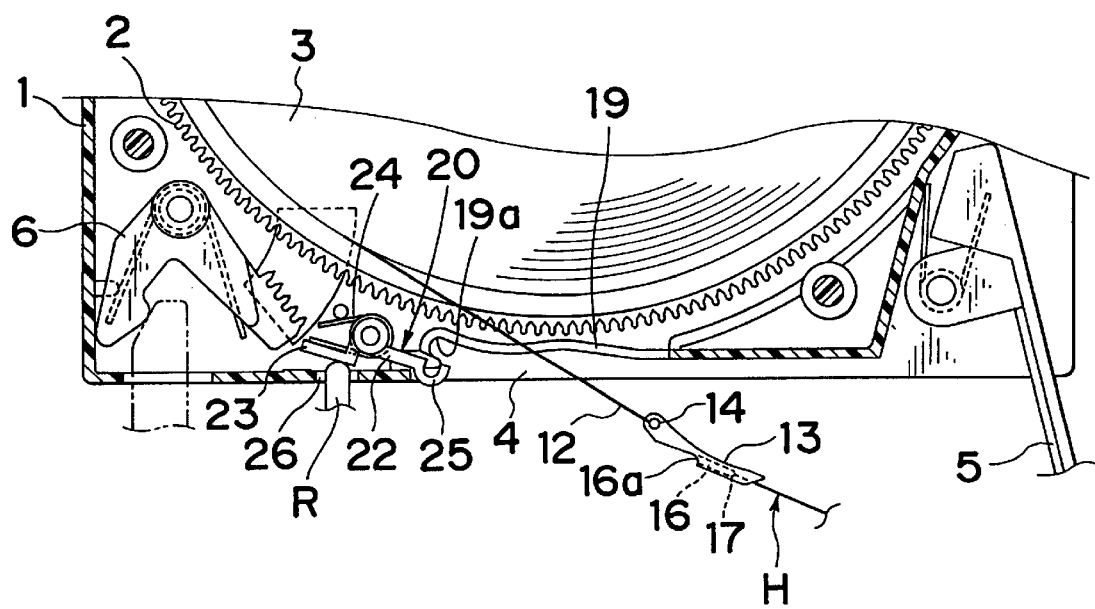
FIG. 4 is a fragmentary top plan view showing the front portion of the tape cartridge with the locking member moved to a release position and also with the recording tape being drawn out of the tape cartridge.

As best shown in FIGS. 3 and 4, a hooking groove 16 for receiving a corresponding end of a catch pin 17 as will be described later is defined in each of the hooking arms 15 so as to extend in a direction generally lengthwise of the corresponding hooking arm 15 and, also, so as to open in a direction confronting the other hooking arm 15. The hooking groove 16 so defined has one end terminating within the corresponding hooking arm 15 at a location inwardly of a free end thereof remote from the leader pin 14 and the opposite end opening forwards as at 16a from a portion of the outer side face thereof at a location adjacent the leader pin 14. It will readily be understood that with the leader member 13 so constructed as hereinbefore described, the hooking grooves 16 in the upper and lower hooking arms 15 open downwardly and upwardly, respectively, so as to confront with each other so that the opposite ends of the catch pin 17 can be received within those hooking grooves 16 in a manner as will be described later.

The catch pin 17 forms a part of a catcher H which in turn forms a part of any known automatic reeling mechanism built in a tape drive (not shown) and is connected to a drive leader tape DT incorporated in the tape drive in a manner similar to the connection between the leader tape 12 and the leader pin 14. This catch pin 17 is normally retracted within the tape drive and is, when the tape cartridge is ready to be used for data recording or retrieval, guided by a loading arm (not shown, but also forming another part of the tape drive) so as to grab the leader member with its opposite ends received in the associated hooking grooves 16 through the groove entrances 16a. Accordingly, when the automatic reeling mechanism in the tape drive is activated, the catcher H being pulled by the automatic reeling mechanism withdraws the length of magnetic tape 2 outwardly from the cartridge housing 1 with the catch pin 17 capturing the leader member 13 in a manner as shown in FIG. 4.

When the tape cartridge is not in use, the leader member 13 then held at the retracted position can be locked in such position by means of a releasable locking mechanism. The locking mechanism referred to above includes generally elongated upper and lower stationary locking members 19 formed integrally with top and bottom panels of the cartridge housing 1 so as to confront the tape window 4. More specifically, each of the upper and lower stationary locking members 19 may be in the form of an elongated rib that is integrally molded with the top or bottom panel of the cartridge housing 1 so as to follow the contour of the inner side face of the adjacent hooking arm 15 as best shown in FIG. 2. Each stationary locking members 19 has one end 19a so formed and so shaped as to be recessed inwardly of the cartridge housing 1 to thereby provide an arcuate seat in which one end of the associated hooking arm 15 adjacent the leader pin 14 can be received snugly when the leader member 13 is in the retracted position.

The locking mechanism also includes a generally elongated movable locking member 20 cooperable with the arcuate seats in the upper and lower stationary locking members 19 to hold the leader pin 14 in position steadily as will be described later. This movable locking member 20 is made of plastic and is of one-piece construction including an elongated lock body 22 having one end formed with a release piece 23 and the other end formed with a hook 25. A portion of the lock body 22 generally intermediate of the length thereof is formed with a bearing boss 21 having its opposite ends journalled respectively to the top and bottom panels of the cartridge housing 1 so that the hook 25 can move angularly between locking and release positions about a longitudinal axis of the bearing boss 21. This movable locking member 20 is normally biased counterclockwise, as viewed in FIGS. 1 and 2 by a biasing spring with the hook 25 moved angularly to the locking position as best shown in FIG. 2. This biasing spring may be a torsional spring 24 loosely mounted on a lower end of the bearing boss 21, as shown in FIG. 3, with its opposite ends engaged respectively to the release piece 23 and a stop pin integral with the bottom panel of the cartridge housing 1 as shown in FIG. 2.

The releasable locking mechanism of the structure described above is so designed and so configured that so long as the tape cartridge is not in use with the leader member 13 held at the retracted position, the opposite ends of the leader pin 14 can be received in the corresponding arcuate seats 19a of the upper and lower stationary locking members 19 while the hook 25 of the movable locking member 20 then biased to the locking position receives therein an intermediate portion of the leader pin 14 that is situated between the upper and lower tape end segments 12a and 12b and that is exposed from the leader tape 12 through the cutout C. Since the biasing force of the torsional spring 24 is transmitted to the leader pin 14 through the movable locking member 20 by way of the hook 25, the leader member 13 can be locked in position at the retracted position with the leader pin 14 grabbed generally in a shakehand fashion between the arcuate seats 19a and the hook 25.

Figure 5:
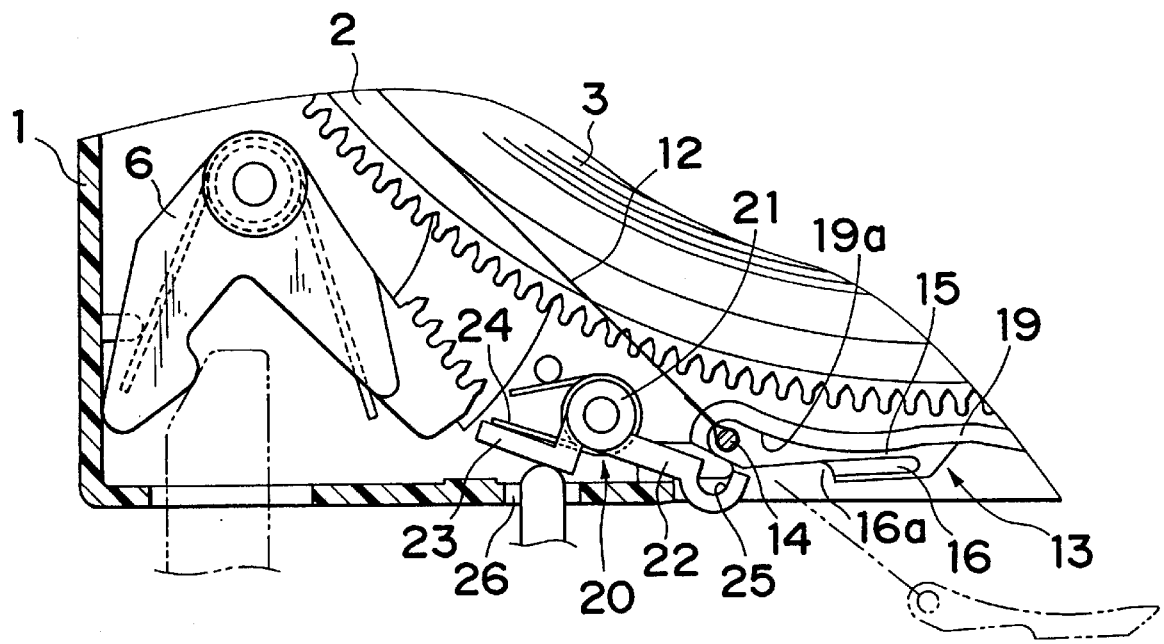
FIG. 5 is a fragmentary top plan view, on an enlarged scale, of the front portion of the tape cartridge, showing the locking member held at the release position.

However, when the tape cartridge of the present invention is loaded into the tape drive, a release pin R provided in the tape drive protrudes into the cartridge housing 1 through an opening 26 defined in a front side wall segment of the cartridge housing 1 adjacent the tape window 4 and is brought into engagement with the release piece 23 to cause the movable locking member 20 to be moved clockwise about the longitudinal axis of the bearing boss 21 against the torsional spring 24. Once this occurs, the hook 25 is moved to the release position as shown in FIGS. 4 and 5, allowing the leader pin 14 ready to be pulled out of the cartridge housing 1. It is to be noted that the opening 26 in the front side wall segment of the cartridge housing 1 is normally closed by the release piece 23 so long as the movable locking member 20 is biased counterclockwise by the torsion spring 24.

Thus, it will readily be seen that even though the magnetic tape 3 wound around the reel hub is loosened with the reel locking pawls 6 and 7 momentarily disengaged from the gear teeth of the reel flange as a result of, for example, drop of the tape cartridge onto a floor, the leader member 13 can be retained in position locked by the releasable locking mechanism. When an external impact is applied to the tape cartridge such as occurring when the tape cartridge is inadvertently fallen onto the floor, not only can the reel locking pawls 6 and 7 be momentarily disengaged from the gear teeth of the reel flange, but the leader pin 14 may also be quivered. The quivering motion of the leader pin 14 can advantageously be absorbed by the torsion spring 24 through the movable locking member 20 then instantaneously pivoting about the bearing boss 21. Accordingly, the releasable locking mechanism embodying the present invention is effective to lock the leader member 13 at the retracted position without allowing the leader pin 14 to depart from the right position, even though the length of magnetic tape 3 is loosened.

As hereinbefore described, when the tape cartridge is not in used, the tape window 4 is closed by the pivotable door 5. At this time, the leader member 13 then held at the retracted position is also covered by the pivotable door 5 and is therefore invisible from the outside of the tape cartridge. This pivotable door 5 has an inner surface formed with a retainer region that is so contoured as to follow the shape of the outer surface of each of the hooking arms 15 such that when the door 5 is in the closed position with the leader member 13 held at the retracted position, the hooking arms 15 can be retained in position sandwiched snugly between the stationary locking members 19 and the pivotable door 5. Thus, not only can the leader pin 14 be firmly grabbed by the releasable locking mechanism, but the hooking arms 15 can also be retained firmly in position sandwiched snugly between the stationary locking members 19 and the pivotable door 5, and therefore, the leader member 13 can advantageously be held stationary and substantially immovable so long as the tape cartridge is not in use.

From the foregoing description, it will readily be seen that when the tape cartridge embodying the present invention is in use having loaded into the tape drive, the pivotable door 5 is opened as shown in FIGS. 4 and 5 with the tape window 4 consequently exposed to the outside. Simultaneously with the loading of the tape cartridge into the tape drive, not only are the reel locking pawls 6 and 7 disengaged from the gear teeth of the reel flange to allow the reel 2 to be rotatable freely, but the movable locking member 20 is pivoted counterclockwise against the torsion spring 24 by the action of the release pin R then pushing the release piece 23. Counterclockwise pivot of the movable locking member 20 results in the hook 25 being angularly moved to the release position to disengage from the leader pin 14.

The tape reel 2 is drivingly coupled with a drive spindle in the tape drive through an access opening (not shown) defined in the bottom panel of the cartridge housing 1 and, thereafter, the catch member H in the tape drive is guided by the loading arm (not shown) of the tape drive into the tape window 4 until the opposite ends of the catch pin 17 are engaged deep into the hooking grooves 16 through the groove entrances 16a. Subsequent withdrawal of the catch member H into the tape drive results in pulling of the leader member 13 outwardly from the retracted position as shown in FIG. 4 with the length of magnetic tape 3 consequently withdrawn from the reel 2 and taken up by the automatic reeling mechanism in the tape drive for data recording or retrieval on or from the length of magnetic tape 3 by means of any known write/read head (not shown), respectively.

After the data recording or retrieval, the length of magnetic tape 3 is rewound around the reel 2 and the leader member 13 is returned to the retracted position in which the opposite ends of the leader pin 14 are received in the respective arcuate seats 19a integral with the stationary locking members 19, and is then locked thereat by the releasable locking mechanism with the hook 25 moved angularly to the locking position as best shown in FIG. 2.

Figure 6:
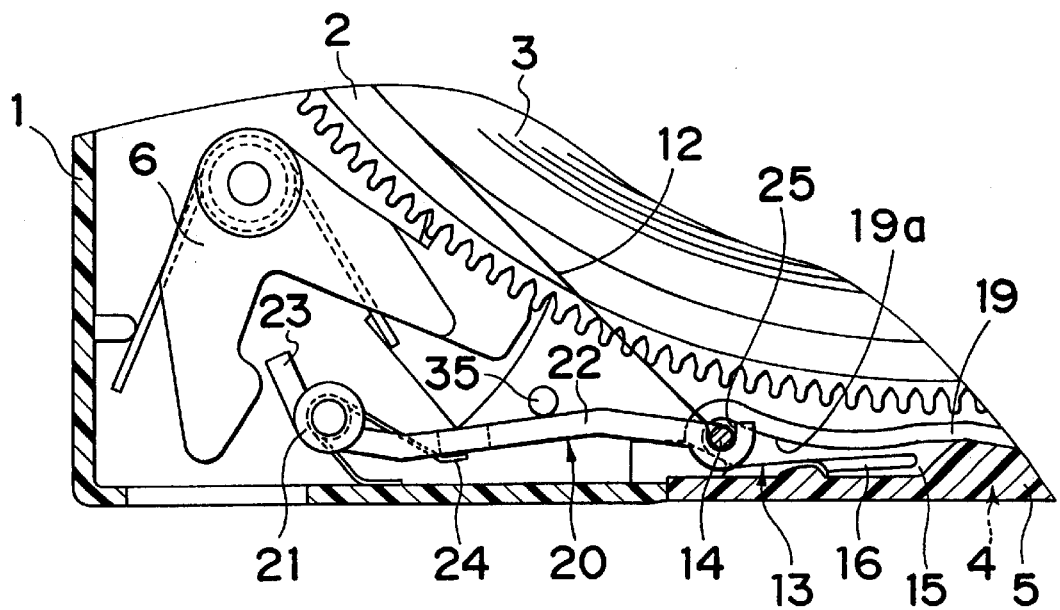
FIG. 6 is a fragmentary top plan view of the front portion of the tape cartridge, showing the locking member employed according to a second preferred embodiment of the present invention.

Second Embodiment (FIGS. 6 and 7)

The second embodiment of the present invention differs from the previously described first embodiment as to the manner in which the movable locking member 20 of the releasable locking mechanism is driven. Referring now to FIGS. 6 and 7, the bearing boss 21 of the movable locking member 20 shown therein is pivotally positioned adjacent one of the reel locking pawls 6 that is operatively positioned adjacent the front wall segment of the cartridge housing 1 so that when the reel locking pawl 6 is driven by a lock release member P of the tape drive to disengage from the gear teeth of the reel flange, the release piece integral with the movable locking member 20 together with the boss 21 can also be pushed to move the movable locking member 20 against the torsion spring 24. More specifically, as best shown in FIG. 7, as the release piece 23 is pushed by the lock release piece P, and shortly before the reel locking pawl 6 is disengaged from the gear teeth of the reel flange, the lock body 22 is angularly moved towards the front wall segment of the cartridge housing 1 against the torsion spring 24 with the hook 25 consequently moved to the release position disengaging from the leader pin 14.

In FIGS. 6 and 7, reference numeral 35 represents a stop piece used to define the locking position for the hook 25.

Third Embodiment (FIGS. 8 and 9)

In any one of the foregoing embodiments, the releasable locking mechanism has been described as including the movable locking member 20. However, in the third embodiment shown in FIGS. 8 and 9, the locking member, now identified by 20', is immovable with the bearing boss 21 fixedly held between the top and bottom panels of the cartridge housing 1.

The locking member 20' shown in FIGS. 8 and 9 is accordingly different in structure from that employed in any one of the previously described foregoing embodiments. More specifically, the movable locking member 20' employed in the third embodiment includes upper and lower lock arms 30 formed integrally with the bearing boss 21 so as to extend outwardly therefrom at right angles thereto, and a receiving arm 31 formed integrally with the bearing boss 21 so as to extend outwardly therefrom at right angles thereto and positioned intermediate between the upper and lower arms 30. Each of the upper and lower lock arms 30 has a free end bifurcated to define a pair of elastically deformable embracing pieces 30a for receiving the respective end of the leader pin 14 therein, whereas the receiving arm 31 has its free end formed with a hook 32 for holding that intermediate portion of the leader pin 14.

In operation, the opposite ends of the leader pin 14 can slide in between the embracing pieces 30a of the associated lock arms 30 while outwardly expanding the embracing pieces 30a against their own resiliency, until they are snapped in between the embracing pieces 30a. As the opposite ends of the leader pin 14 are snapped in between the embracing pieces 30a of the associated lock arms 30, the intermediate portion of the leader pin 14 deforms the receiving arm 31 inwardly of the cartridge housing 1 against its own resiliency so that when the intermediate portion of the leader pin 14 slides over the hook 32, the receiving arm 31 can restore to the original shape, as biased by its own resiliency, with the hook 32 consequently receiving therein that intermediate portion of the leader pin 14. In this way, the leader member 13 can be locked at the retracted position and immovably and will not depart therefrom even when the external impact is applied to the tape cartridge. The arms 30 and 31 are so deformable as to absorb the external impact applied to the tape cartridge and, therefore, the leader pin 14 can be held substantially immovable without allowing the leader pin 14 to depart from the arcuate seats 19a and/or to displace from the right position and the leader member 13 is hence firmly locked at the retracted position.

Release of the leader member 13 from the retracted position in which the leader member 13 is locked in position by the locking mechanism can be accomplished in response to loading of the tape cartridge into the tape drive, at which time the receiving arm 31 is urged inwardly of the cartridge housing by a lock release pin built in the tape drive to thereby allow the leader pin 14 to be disengaged from the hook 32.

Figure 10:
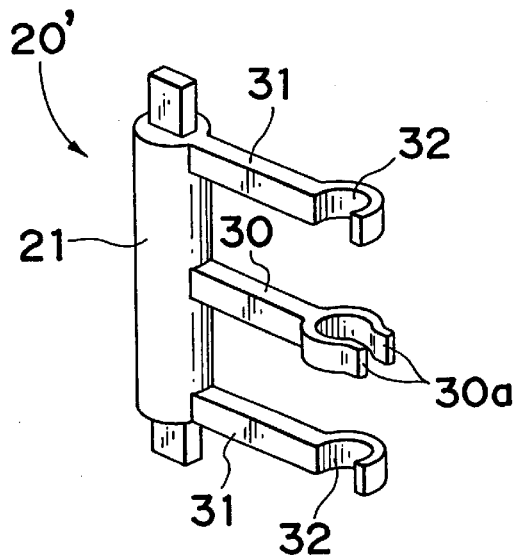
FIG. 10 is a view similar to FIG. 8, showing the locking member employed according to a fourth preferred embodiment of the present invention.

Fourth Embodiment (FIG. 10)

The locking member 20' of the structure described in connection with the foregoing embodiment of FIGS. 8 and 9 may be modified as shown in FIG. 10, wherein instead of the use of the two lock arms 30 and the single receiving arm 31, two receiving arms 31 and a single lock arm 30 are employed with the lock arm 30 positioned intermediate between the upper and lower receiving arms 31. Where the locking member 20' shown in FIG. is to be employed, care must be taken that the upper and lower lock arms 31 have to be spaced a distance larger than the width of the length of magnetic tape 3 and also to be positioned externally of the width of the length of magnetic tape 3 so that the length of magnetic tape 31 can move in and out between the upper and lower lock arms 31.

Figure 11:
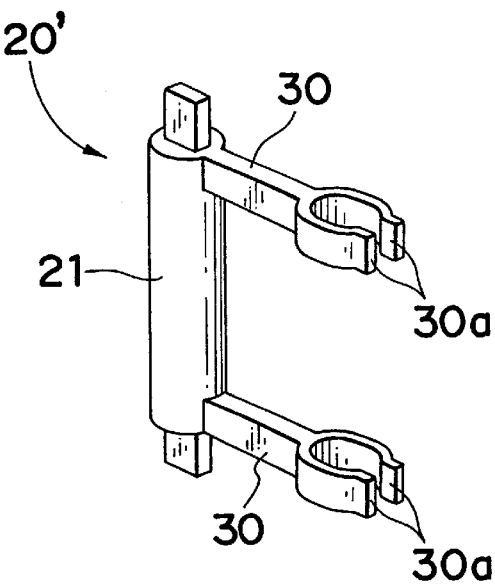
FIG. 11 is a view similar to FIG. 8, showing the locking member employed according to a fifth preferred embodiment of the present invention.
Figure 12:
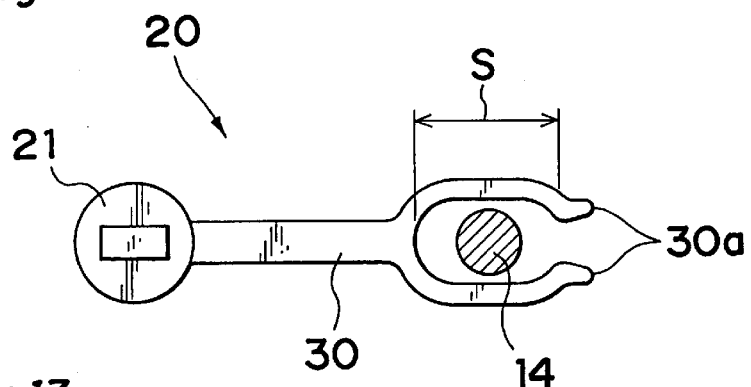
FIG. 12 is a to plan view showing the locking member of FIG. 11 in relation to the leader member.

Fifth Embodiment (FIGS. 11 and 12)

The locking member 20" shown in FIGS. 11 and 12 is substantially similar to the locking member 20' shown in FIGS. 8 and 9, but differs therefrom in that the intermediate lock arm 31 is eliminated and, also, in that each of the embracing pieces 30a of each lock arm 30 has a length, measured in a direction conforming to the longitudinal sense of the respective lock arm 30, that is larger than that shown in FIGS. 8 and 9, so that the corresponding end of the leader pin 14 can be loosely movable in a direction parallel to the longitudinal sense of the respective lock arm 30 within a space S delimited between the embracing pieces 30a. According to this design, when the leader pin 14 moves with its opposite ends moving within the associated spaces S between the elongated embracing pieces 30a of the upper and lower lock arms 30 under the influence of the external impact acting on the tape cartridge, impact energies can be attenuated advantageously.

In this design, however, the leader member 13 can displace relative to the locking members 19 with the opposite ends of the leader pin 14 loosely received within the spaces S. In order to ensure a sure engagement of the catcher H with the hooking arms 15 even though the leader member 13 displace in this way, the groove entrance 19a leading to the corresponding hooking groove 16 in each of the hooking arms 15 is so designed as to have an opening width that is larger than the amount of displacement of the leader pin 14.

Figure 13:
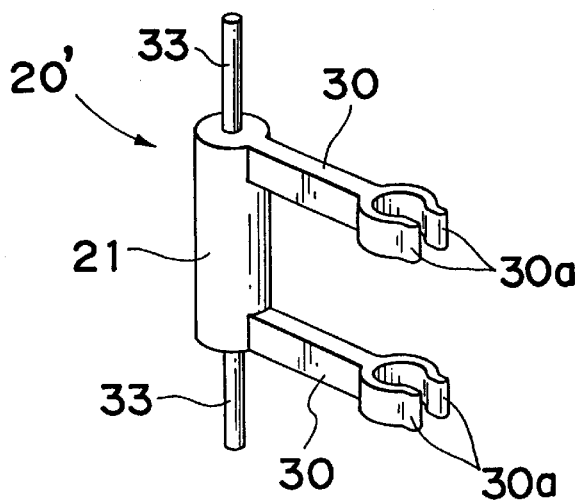
FIG. 13 is a view similar to FIG. 8, showing the locking member employed according to a sixth preferred embodiment of the present invention.

Sixth Embodiment (FIG. 13)

The locking member 20' employed in the sixth embodiment of the present invention is substantially similar to that employed in the third embodiment of FIGS. 7 and 8, but differs therefrom in that the intermediate lock arm 31 shown in FIG. 8 is eliminated and, also, in that an elastically deformable stud shaft 33 is insert-molded together with the bearing boss 21 with its opposite ends protruding outwardly from the bearing boss 21. The locking member 20' shown in FIG. 13 is fixedly supported between the top and bottom panels of the cartridge housing by means of the opposite ends of the stud shafts 33 so that the bearing boss 21 and, hence, the locking member 20 can displace with the opposite ends of the stud shaft 33 deformed elastically to absorb an external impact acting on the leader member 13.

Although the present invention has been described in connection with the preferred embodiments thereof with reference to the accompanying drawings, it is to be noted that various changes and modifications are apparent to those skilled in the art. For example, the locking member 20' may be made slidable reciprocatingly to selectively lockedly retain or release the leader pin 14. Also, the leader pin 14 which has been described as made of stainless steel may be made of plastic, in which case the leader pin can be formed integrally with the hooking arms 15.

Furthermore although the leader member 13 has been so shaped as to represent a generally U-shaped configuration including the leader pin 14 and the hooking arms 15, it may be formed to represent a square frame or a curved plate. Since each of the stationary locking members 19 has to be formed to fit to the shape of the leader member 13, the contour of each stationary locking member 19 is not always limited to that shown in connection with the various embodiments of the present invention.

Accordingly, such changes and modifications are to be understood as included within the scope of the present invention as defined by the appended claims, unless they depart therefrom.

What is claimed is:

1. A single-reel tape cartridge cooperable with an operatively compatible tape drive including a tape catch member and a lock release pin, said tape cartridge comprising:

a cartridge housing having a tape window and a lock release pin opening defined therein;

a single reel rotatably accommodated within the cartridge housing and having a roll of a length of magnetic recording tape coaxially mounted thereon, said length of magnetic recording tape having one end anchored to the reel and the opposite end provided with a leader member that is positioned adjacent the tape window, said leader member being engageable with the tape catch member when the length of magnetic tape is to be drawn out of the cartridge housing and into the tape drive; and a releasable locking mechanism including a pair of first locking members and a second locking member cooperable with each other to lock the leader member at a retracted position at which the leader member is housed within the cartridge housing and positioned adjacent the tape window, wherein the first locking members are secured to top and bottom panels of the cartridge housing adjacent the tape window for receiving the leader member at the retracted position in a predetermined posture and the second locking member is positioned adjacent the tape window and cooperates with the first locking members to lock the leader member at the retracted position, said second locking member including a bearing boss for mounting the second locking member within the cartridge housing, said bearing boss having a longitudinal axis perpendicular to a lengthwise direction of the magnetic tape;

wherein a portion of said second locking member is positioned adjacent to the lock release pin opening, said portion being engageable with the lock release pin to pivot said second locking member out of engagement with the leader member.

2. The single-reel tape cartridge as claimed in claim 1, wherein the leader member comprises a leader pin and a hooking arm connected to each of opposite ends of the leader pin so as to extend generally perpendicular to the leader pin, the hooking arms on the respective ends of the leader pin being cooperable with the catch member when the length of magnetic tape is to be drawn out of the cartridge housing.

3. The single-reel tape cartridge as claimed in claim 2, wherein the second locking member comprises an elongated lock body reciprocatingly displaceably supported by the cartridge housing, and a separate biasing spring housed within the cartridge housing for urging the elongated lock body in a direction required for the elongated lock body to engage the leader pin.

4. The single-reel tape cartridge as claimed in claim 2, wherein said bearing boss is journalled by and within the cartridge housing for angular movement about its own longitudinal axis, said second locking member further comprising an elongated lock body formed integrally with the bearing boss so as to extend in a first direction generally perpendicular to the longitudinal axis of the bearing boss, and a lock release piece formed integrally with the bearing boss so as to extend in a second direction counter to the first direction, said elongated lock body applying a retaining force to the leader pin to lock the leader pin at the retracted position in cooperation with the first locking members.

5. The single-reel tape cartridge as claimed in claim 2, wherein the second locking member further comprises an elongated lock body formed integrally with the bearing boss so as to extend in a first direction generally perpendicular to the bearing boss, said elongated lock body including at least one lock arm having a free end thereof bifurcated to define a pair of elastically deformable embracing pieces for receiving the leader pin therein, and at least one receiving arm having a free end thereof formed with a hook for holding the leader pin, and wherein a direction of detachment of the leader pin relative to the lock arm and a direction of detachment of the leader pin relative to the receiving arm lie at an angle to each other.

6. The single-reel cartridge as claimed in claim 2, wherein the second locking member further comprises an elongated lock body formed integrally with the bearing boss so as to extend in a first direction generally perpendicular to the bearing boss, said elongated lock body including a pair of receiving arms for engagement with opposite ends of the leader pin in a direction outwardly of the cartridge housing and a lock arm for receiving a portion of the leader pin intermediate between the opposite ends thereof.

7. The single-reel tape cartridge as claimed in claim 2, wherein the cartridge housing also has a pivotally supported door for selectively closing or opening the tape window and has an inner side face leading towards an interior of the cartridge housing, said inner side face of the door being configured to retain the leader pin at the retracted position when the door is in position to close the tape window.

8. The single-reel tape cartridge as claimed in claim 1, wherein the second locking member further comprises an elongated lock body formed integrally with the bearing boss so as to extend in a first direction generally perpendicular to the bearing boss, said elongated lock body including at least one lock arm having a free end thereof bifurcated to define a pair of elastically deformable embracing pieces for receiving the leader member therein, and at least one receiving arm having a free end thereof formed with a hook for holding the leader member, and wherein a direction of detachment of the leader member relative to the lock arm and a direction of detachment of the leader member relative to the receiving arm lie at an angle to each other.

9. The single-reel cartridge as claimed in claim 1, wherein to second locking member further comprises an elongated lock body formed integrally with the bearing boss so as to extend in a first direction generally perpendicular to the bearing boss, said elongated lock body including a pair of receiving arms for engagement with opposite ends of the leader member in a direction outwardly of the cartridge housing and a lock arm for receiving a portion of to leader member intermediate between to opposite ends thereof.

10. The single-reel tape cartridge as claimed in claim 1, wherein the cartridge housing also has a pivotally supported door for selectively dosing or opening the tape window and has an inner side face leading towards an interior of the cartridge housing, said inner side face of the door being configured to retain the leader member at the retracted position when the door is in position to close the tape window.

11. The single-reel tape cartridge as claimed in claim 1, wherein said second locking member includes an elongated lock body formed integrally with the bearing boss so as to extend in a first direction generally perpendicular to the longitudinal axis of the bearing boss, said elongated lock body engaging the leader member at a position generally intermediate to the first locking members.

12. The single-reel tape cartridge as claimed in claim 1, wherein said second locking member is pivotably mounted for rotation within said cartridge housing for rotation about an axis generally perpendicular to a lengthwise direction of the magnetic tape.

13. The single-reel tape cartridge as claimed in claim 1, wherein the second locking member comprises an elongated lock body reciprocatingly displaceably supported by the cartridge housing, and a separate biasing spring housed within the cartridge housing for urging the elongated lock body in a direction required for the elongated lock body to engage the leader member.

14. The single-reel tape cartridge as claimed in claim 1, wherein said bearing boss is journalled by and within the cartridge housing for angular movement about its own longitudinal axis, said second locking member further comprising an elongated lock body formed integrally with the bearing boss so as to extend in a first direction generally perpendicular to the longitudinal axis of the bearing boss, and a lock release piece formed integrally with the bearing boss so as to extend in a second direction counter to the first direction, said elongated lock body applying a retaining force to the leader member to lock the leader member at the retracted position in cooperation with the first locking members.

15. A single-reel tape cartridge cooperable with an operatively compatible tape drive including a tape catch member, said tape cartridge comprising:

a cartridge housing having a tape window defined therein;

a single reel rotatably accommodated within the cartridge housing and having a roll of a length of magnetic recording tape coaxially mounted thereon, said length of magnetic recording tape having one end anchored to the reel and the opposite end provided with a leader member that is positioned adjacent the tape window, said leader member being engageable with the tape catch member when the length of magnetic tape is to be drawn out of the cartridge housing and into the tape drive; and a releasable locking mechanism including a pair of first locking members and a second locking member cooperable with each other to lock the leader member at a retracted position at which the leader member is housed within the cartridge housing and positioned adjacent the tape window, wherein the first locking members are secured to top and bottom panels of the cartridge housing adjacent the tape window for receiving the leader member at the retracted position in a predetermined posture and the second locking member is positioned adjacent the tape window and cooperates with the first locking members to lock the leader member at the retracted position, wherein the second locking member comprises a bearing boss journalled by and within the cartridge housing for angular movement about its own longitudinal axis, an elongated lock body formed integrally with the bearing boss so as to extend in a first direction generally perpendicular to the longitudinal axis of the bearing boss, and a lock release piece formed integrally with the bearing boss so as to extend in the second direction counter to the first direction, said elongated lock body applying a retaining force to the leader pin to lock the leader pin at the retracted position in cooperation with the first locking members.

* * * * *